United States Patent
Hernacki et al.

(10) Patent No.: US 8,819,413 B1
(45) Date of Patent: Aug. 26, 2014

(54) METHOD AND APPARATUS FOR COLLABORATIVE CLAIM VERIFICATION

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 1344 days.

(21) Appl. No.: 11/644,539

(22) Filed: Dec. 22, 2006

(51) Int. Cl.
*H04L 29/00* (2006.01)

(52) U.S. Cl.
USPC ........... 713/155; 713/151; 713/156; 713/172; 713/186; 726/5; 726/6; 726/9

(58) Field of Classification Search
USPC ......... 713/151, 155, 156, 172, 176, 168, 182, 713/186; 726/5, 6, 9
See application file for complete search history.

(56) References Cited

U.S. PATENT DOCUMENTS

2002/0083008 A1* 6/2002 Smith et al. .................... 705/64
2002/0178038 A1* 11/2002 Grybas ............................ 705/7

\* cited by examiner

*Primary Examiner* — Brandon Hoffman
*Assistant Examiner* — Michael D Anderson
(74) *Attorney, Agent, or Firm* — Wilmer Cutler Pickering Hale and Dorr LLP

(57) ABSTRACT

A method and apparatus for providing collaborative claim verification using an identification management (IDM) system. The IDM system collaborates with at least one trusted authority that provides information to a validity database within the IDM system. The database information collected from the at least one trusted authority is used to verify a user's entered identification information i.e., a user's identity claim. Such validation through a plurality of trusted authorities can provide a statistical truth to the identity claims provided by a user.

15 Claims, 3 Drawing Sheets

METHOD AND APPARATUS FOR COLLABORATIVE CLAIM VERIFICATION

BACKGROUND OF THE INVENTION

1. Field of the Invention

The present invention relates to computer network service access management and, more particularly, to a method and apparatus for providing collaborative claim verification using an identity management system to verify identity claims.

2. Description of the Related Art

In identity management systems used to verify identity claims of computer network users, there are certain types of identity claims that are difficult to verify for certain parties through normal identity verification channels. For example, verifying the age of a minor is generally difficult. While for adults, verification of age is often a tractable problem that can be tied to government identification or credit information; for minors, there is generally no public database that will provide identification and age verification for children under the age of 16. Yet, age verification is as critical for children as for adults when interacting with services provided via the Internet. Many access control systems, content filters, and parental control systems attempt (or would like) to use age as a determining factor in providing services through the Internet. Many service providers on the Internet state that children under a certain age are not permitted to utilize their services, yet there is no mechanism for verifying a user's age when the user requests a service.

Current systems, at best, require that there be a registered adult account that provisions an account for a minor. While provisioning the account, the adult can specify the age or grouping of information within the minor account. The problem is that it is easy for an adult to provision a fake minor account to gain access sites designed for child interaction. While systems that require an adult to register initially using some trackable identification, e.g., a credit card, provide a partial solution, the solution is not ideal. Some systems rely purely on self-credentialing, i.e., allowing the user to specify their own age and, in essence, self-verify their own information. Clearly, this is a poor solution.

Therefore, there is a need in the art for an identification management system that provides collaborative claim verification to ensure that identity information can be verified.

SUMMARY OF THE INVENTION

The present invention is a method and apparatus for providing collaborative claim verification using an identification management (IDM) system. The IDM system collaborates with at least one trusted authority that provides information to a validity database within the IDM system. The database information collected from the at least one trusted authority is used to verify a user's entered identification information i.e., a user's identity claim. Such validation through a plurality of trusted authorities can provide a statistical truth to the identity claims provided by a user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
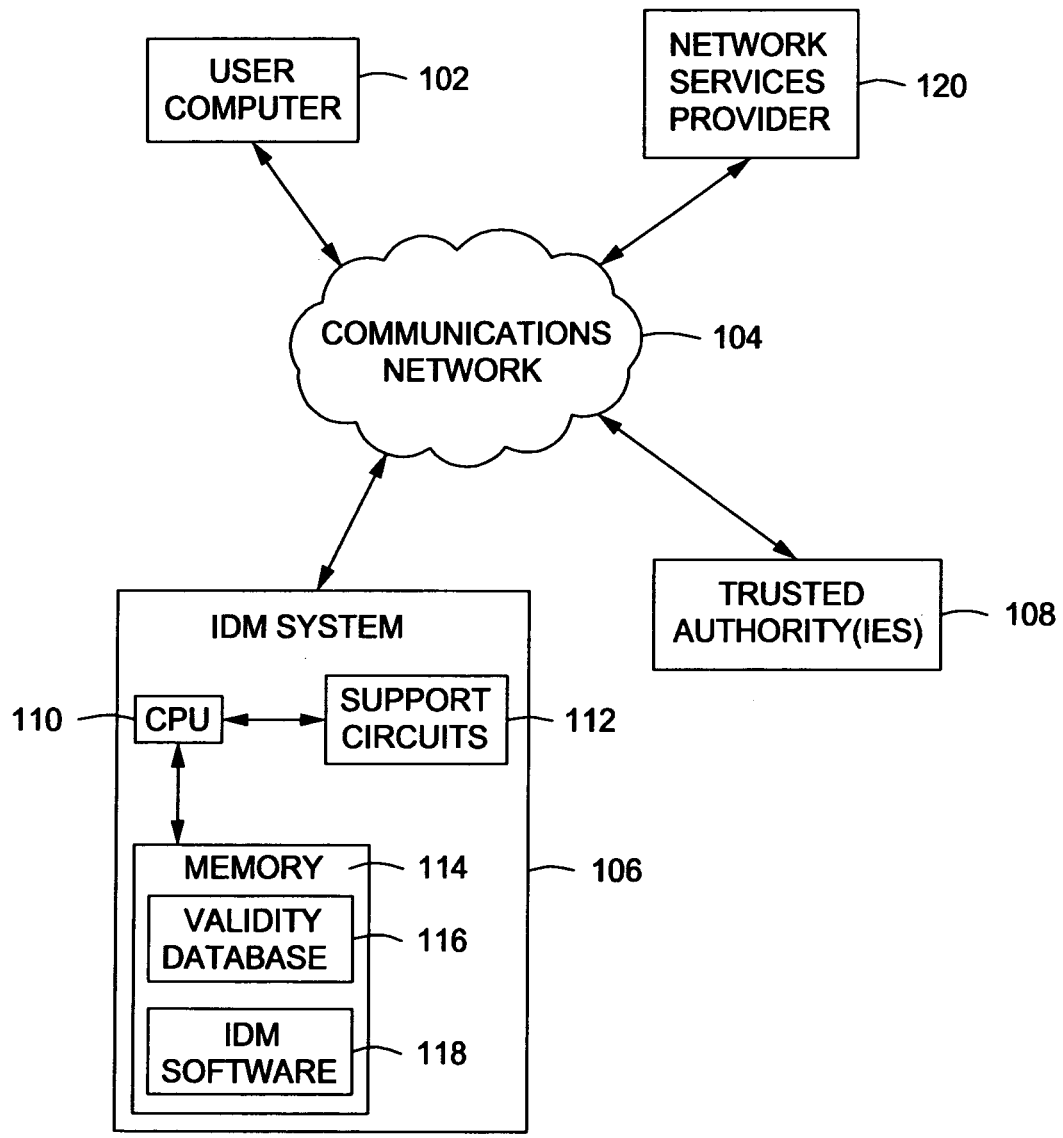
FIG. 1 depicts a block diagram of a network utilizing an identification management system that forms one embodiment of the present invention.

FIG. 1 depicts a block diagram of a computer network 100 comprising a user computer 102, a communications network 104, an identification management (IDM) system 106, and at least one trusted authority 108. The user computer 102, the IDM system 106 and the at least one trusted authority 108 communicate with one another through the communication network 104 to produce verified identification information for a user of the user computer.

The user computer 102 is any form of computer terminal including a desktop computer, laptop computer, personal digital assistant, cell phone, or any other device that provides and/or receives information from a communications network. For purposes of describing the invention, the user computer 102 is a device that can access network services (e.g., website, FTP site, and the like) from a network services provider 120 via the communications network 104. To access the services, it is assumed that the user computer 102 must provide user identification information (i.e., implicitly claiming that the information is correct). The service provider 120 checks the veracity of the provided identification information by contacting the IDM system 106.

The communications network 104 may include Internet or intranet using various communications infrastructure such as Ethernet, WiFi, WiMax, GPRS, and the like. Such communications infrastructure is collectively referred to as the Internet.

The IDM system 106 comprises at least one central processing unit (CPU) 110, support circuits 112, and memory 114. The CPU 110 may be one or more commercially available microprocessors and/or microcontrollers used in computer systems. The support circuits 112 comprise circuits and devices that are utilized to support the operation of the CPU 110. These support circuits 112 may comprise, for example, cache, power supplies, clock circuits, input/output circuits, network interface cards, device drivers and the like. The memory 114 may comprise one or more of random access memory, read-only memory, disk drives, removable memory, flash memory, optical memory and the like. The IDM system 106 utilizes IDM software 118 to provide identification management services to the users of the network 104. To facilitate providing claim of verification and validation, the IDM software 118 interacts with a validity database 116. The validity database 116 comprises information that is used to verify identity claims of users.

The IDM system 106 collaborates with at least one trusted authority 108 to populate the validity database 116. Typically, a user will provide certain identity claims to the IDM system 106 that are used to identify that user. Such claims may include birth date, name, address, credit card information, age, driver license number, social security number and other information that uniquely identifies the user. The IDM system 106 utilizes the user provided information to validate claim queries from services (e.g., service provider 120) that are coupled to the network 104.

To verify and validate these identity claims to ensure that the IDM system can accurately validate a user, the IDM system 106 communicates through the communications network 104 to at least one trusted authority. Such communication is utilized to query the trusted authority or authorities to verify the veracity of the identity claims provided by the user. For example, the user may claim to be a minor under the age of 16. To verify this claim, the IDM system communicates with the user's school and uses the school records to confirm that the user is indeed a minor under 16 years old. The verified information is stored in the validity database 116 to be used to verify identity claims that are subsequently made to service providers. For many claims, the IDM system may use a plurality of trusted authorities and statistically develop verification for the information provided by the user, i.e., if a number of authorities agree, the information is deemed verified.

Figure 2:
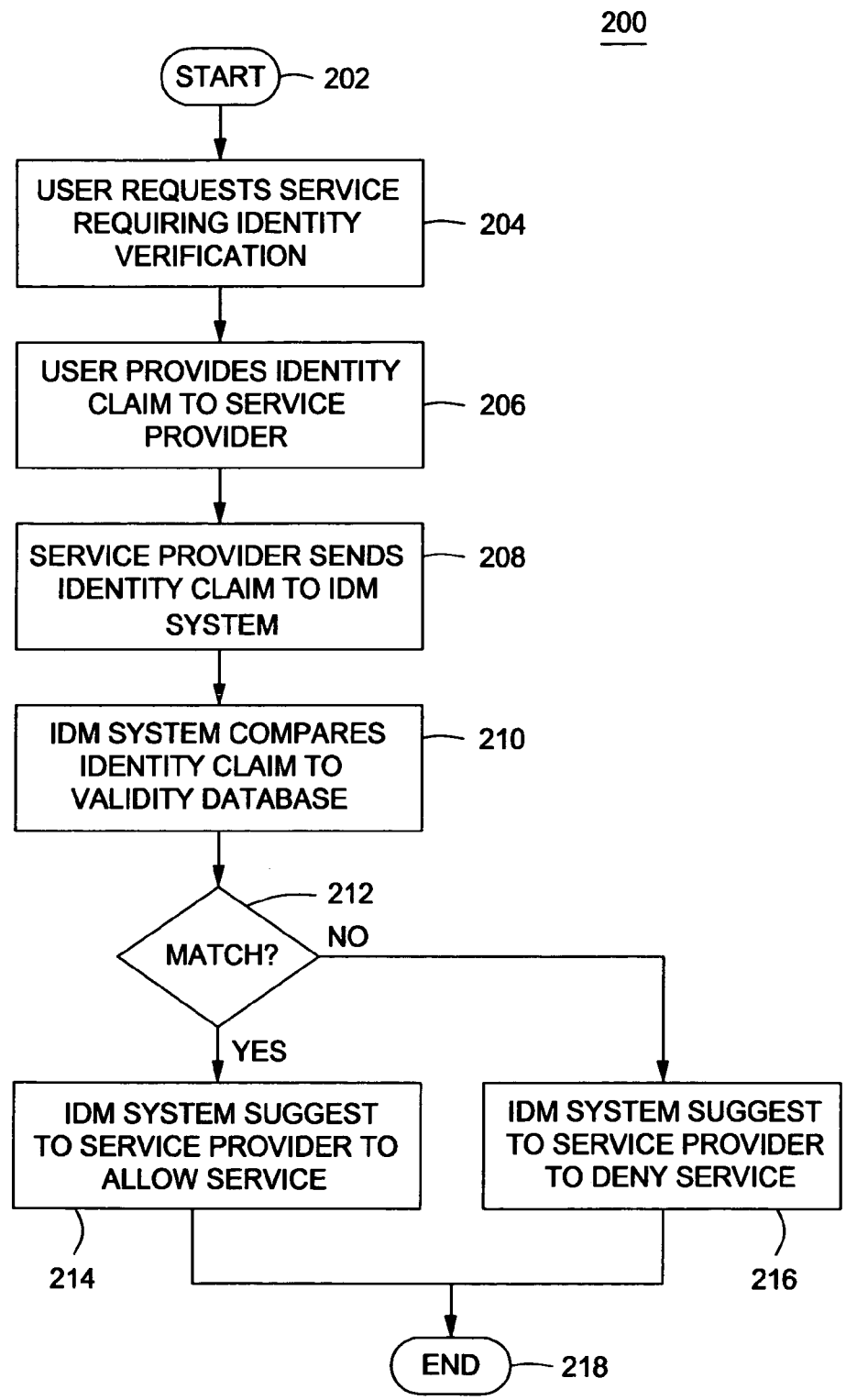
FIG. 2 is a flow diagram of a method of use of the identification management system of the present invention.

FIG. 2 depicts a flow diagram of a method 200 for utilization of the IDM system. The method begins at step 202 and proceeds to step 204, wherein the user requests a service requiring an identity verification. Such a service may include requesting access to a website that can only be accessed by adults or of persons over the age of 14. At step 206, the user provides an identity claim to the service provider. Such a service request needs to be verified by the IDM system.

At step 208, the claimed information is sent from the service provider to the IDM system. The IDM system, at step 210, compares the identification information that was provided by the user to the information in the validity database. In this manner, the IDM system collaborates with one or more trusted authorities to verify the user's identification information. The information within the validity database is assumed to be accurate and verified (see FIG. 3 below and its accompanying text for a description regarding IDM system validity database information population). At step 212, the method 200 queries whether the identification information within the database matches the information provided by the service provider. If the match is not found, the IDM system recommends to the service provider, at step 216, that the service be denied. If the identification information provided by the service provider matches the validated information within the IDM system, at step 214, the method 200 recommends that access to the service be allowed. At step 218, the method 200 ends.

Figure 3:
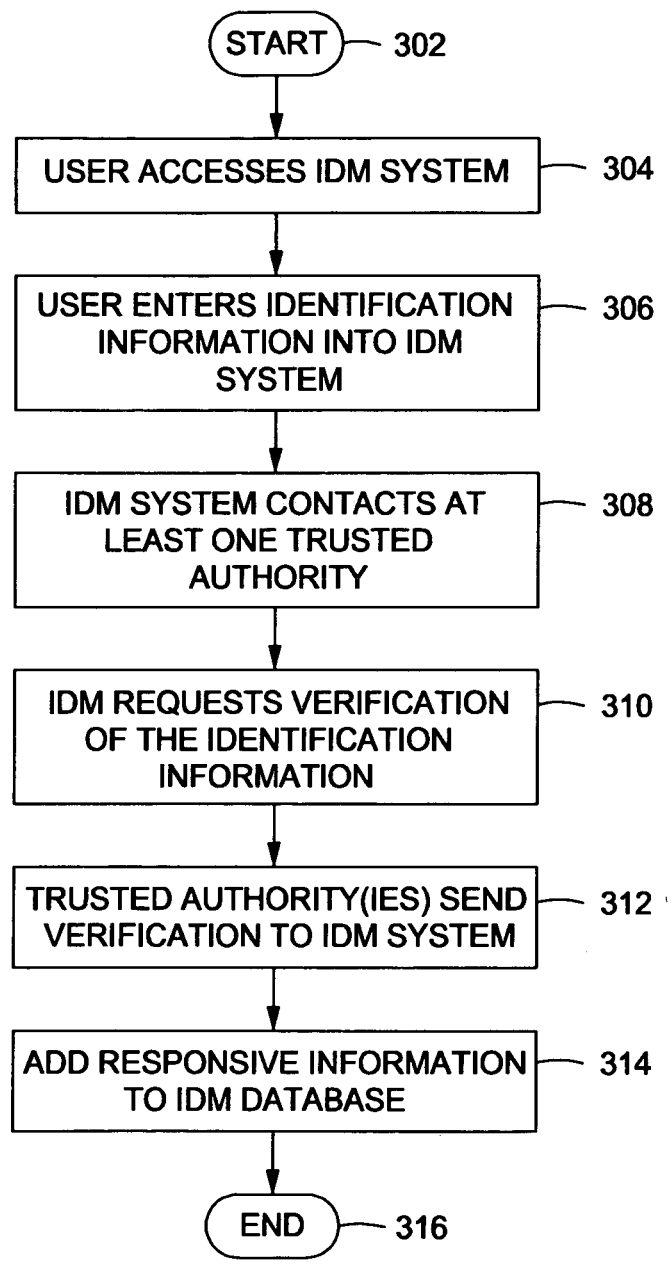
FIG. 3 depicts a flow diagram of a method of providing data to a validity database within the identification management system of the present invention.

FIG. 3 depicts a flow diagram of a method 300 for populating the validity database 116 of the identification management system 106 of FIG. 1. The method 300 begins at step 302 and proceeds to step 304, wherein a user accesses the IDM system. The access may be as a requirement of a service provider, or the user may enroll in a security protocol offered by a IDM system. At step 306, the user enters identification information into the IDM system. At step 308, the IDM system contacts at least one trusted authority to confirm and verify the identification information (e.g., one or more identity claims) that has been entered by the user. To facilitate a secure transaction, the IDM system provides the trusted authority with a digital certificate, or uses another strong authentication technique, as well as a mechanism for data export into the identification management system. At step 310, the IDM system requests verification of the identification information. In this manner, the IDM system collaborates with one or more trusted authorities to verify the user's identification information. Upon verification (or non-verification) of the user's identity claims, at step 312, the trusted authority uses this secure mechanism to indicate to the IDM system that the claim has been validated. At step 314, the IDM system associates the identity claim with both the identity of the user and the trusted authority that was used to validate the claim. The associated information is then added to the validity database.

The mechanism used to process the claim could be either (or both) a portal service or a local "batching tool" to enable integration with business processes of the verifying trusted authority. The process for verifying information with at least one trusted authority may occur on a scheduled basis to ensure that the validity database is maintained up-to-date.

The process of updating the validity database ends at step 314. Steps 308 through 316 may be periodically repeated to maintain the accuracy of the validity database.

The technique used by the present invention relies on some particular properties of the trusted authority. First, the authority must have some incentive to provide the information requested by the identification management system and, second, the authority must have a strong disincentive to provide false information. In such a system, any false information provided can be traced back to the trusted authority. This by itself is not sufficient to ensure that false information is not provided. There must be some penalty associated with such false provisioning. In many cases, the system relies on external, contact-specific penalties rather than attempting to create a contractible, e.g., monetary, penalty. Finally, the authenticating authority must have some recognition as a reasonable authority on the identity claim in question, at least with the context in which the claim is used and relative to the value of the claim.

One example is to use school databases as the validating trust authority for information regarding minors. Schools are well-known entities, and they have first-hand knowledge of the minors and their age. Schools also have some amount of interest in assisting children in remaining safe while using the Internet and maintaining some level of information filtering based on age. Based on enrollment, a school administrator may provide information to identify the children and their age grouping. It is also possible that they could provide an email address, instant messaging address, grade level, class grouping information, and the like. Clearly, such information collection would be performed with parental consent. By having such information available to the validity database, parents could utilize rules that define access for a particular student based on their age. For example, a parent may limit a child's access to instant messaging to communicate only with people from their school within their grade level. As such, when a child logs into the instant messaging system, the IDM system validates the users identity claim and the user is enabled to message people in their grade level. In this example, the child's "identity" comprises the people the child may communicate with using instant messaging. Such limitations heretofore have not been utilized due to the inability to verify the age and grade level of users.

Given that the system collects the information firsthand from parents and school administrators, the system seems subject to very little fraud. It is expected that malicious administrators are rare, and if a malicious administrator did exist, they would easily be traced and face large penalties.

Other trusted authorities may include the Boy Scouts, religious organizations, social clubs, professional associations, and the like. While the legal and social restrictions cause the availability of the information to vary regionally, the general concept seems to have some applicability in most regions. Furthermore, information can be verified on a statistical basis where a plurality of trusted authorities are accessed to provide various levels of verified data. The various levels of verified data and the trustworthiness of that data may be weighted by IDM system to determine a statistical truth of the information provided. This is particularly useful in countries where government records are untrustworthy or marginally trustworthy such that identification information can be gathered from many authorities including trade organizations and professional associations as well as the government information. The gathered information is then weighted to determine a statistical truth regarding the identification of the user.

In a manner described above, the claims of a user may be verified using a collaborative system of gathering information from at least one trusted authority and utilizing that information within a validity database to test the veracity of identity claims. In this manner, services that are provided through computer network can have the users verified as to their identification in a trustworthy manner.

While the foregoing is directed to embodiments of the present invention, other and further embodiments of the invention may be devised without departing from the basic scope thereof, and the scope thereof is determined by the claims that follow.

What is claimed is:

1. A method of verifying the veracity of identity information comprising:
   providing user identification information to an identification management system;
   contacting a plurality of trusted authorities, separate from the identification management system, to verify the user identification information;
   combining verification information provided by each of the plurality of trusted authorities to form a statistical truth regarding the user identification information, wherein the statistical truth comprises a binary determination of whether the user identification information is accurate based on a comparison of the plurality of the trusted authorities, wherein the information is deemed accurate if more than half of the plurality of trusted authorities are in agreement;
   storing the verification information from the plurality of trusted authorities to a validity database for use in subsequently verifying user identification, wherein the validity database is maintained locally as part of the identification management system, separate from the trusted authorities, wherein the validity database comprises a set of valid identity claims, wherein each valid identity claim comprises an identity and a plurality of trusted authorities used to validate the claim; and
   responding to a request from a third party to indicate whether a provided identity claim is valid based upon whether the provided identity claim is present in the validity database.

2. The method of claim 1 wherein the user identification information comprises at least one identity claim.

3. The method of claim 1 wherein the plurality of trusted authorities comprises at least one database of information regarding children.

4. The method of claim 3 wherein the at least one database of information regarding children is hosted by a school.

5. The method of claim 3 wherein the information regarding children comprises at least one of age and grade level.

6. A method of verifying identification information comprising:
   receiving at an identification management system a user identification claim from a service provider;
   combining verification information provided by a plurality of trusted authorities to form a statistical truth regarding the user identification information, wherein the statistical truth comprises a binary determination of whether the user identification information is accurate based on a comparison of the plurality of the trusted authorities, wherein the information is deemed accurate if more than half of the plurality of trusted authorities are in agreement;
   comparing the user identification claim to identification information in a validity database, where the identification information has previously been verified through collaboration of the identification management system and the plurality of trusted authorities, wherein the validity database is maintained locally as part of the identification management system, separate from the trusted authorities and wherein the validity database comprises a set of valid identity claims, wherein each valid identity claim comprises an identity and a plurality of trusted authorities used to validate the claim; and
   communicating a result of the comparison to the service provider wherein the result indicates whether the user identification claim is present in the validity database.

7. The method of claim 6 wherein the user identification information comprises at least one identity claim.

8. The method of claim 6 wherein the plurality of trusted authorities comprises at least one database of information regarding children.

9. The method of claim 8 wherein the at least one database of information regarding children is hosted by a school.

10. The method of claim 6 the information regarding children comprises at least one of age and grade level.

11. An apparatus for verifying the veracity of identification claims comprising:
    an identification management system having a validity database that is populated with verified identification information, where the verified identification information is verified by collaborating with a plurality of trusted authorities, wherein the verification information is provided by the plurality of trusted authorities and combined to form a statistical truth regarding the user identification information, wherein the statistical truth comprises a binary determination of whether the user identification information is accurate based on a comparison of the plurality of the trusted authorities, wherein the information is deemed accurate if more than half of the plurality of trusted authorities are in agreement, wherein the validity database is separate from the trusted authorities and wherein the validity database comprises a set of valid identity claims, wherein each valid identity claim comprises an identity and a plurality of trusted authorities used to validate the claim and wherein the identification management system responds to a request from a third party to indicate whether a provided identity claim is valid based upon whether the provided identity claim is present in the validity database receives.

12. The apparatus of claim 11 wherein the identification management system is responsive to requests for identity claim verification requests received from service providers.

13. A system for verifying the veracity of identification claims comprising:
    an identification management system having a validity database that is populated with verified identification information, wherein the verification information is provided by the plurality of trusted authorities and combined to form a statistical truth regarding the user identification information, wherein the statistical truth comprises a binary determination of whether the user identification information is accurate based on a comparison of the plurality of the trusted authorities, wherein the information is deemed accurate if more than half of the plurality of trusted authorities are in agreement, wherein the validity database is maintained locally as part of the identification management system, separate from the plurality of trusted authorities and wherein the validity database comprises a set of valid identity claims, wherein each valid identity claim comprises an identity and a plurality of trusted authorities used to validate the claim and wherein the identification management system responds to a request from a third party to indicate whether a provided identity claim is valid based upon whether the provided identity claim is present in the validity database receives;

the plurality of trusted authorities comprising a database of trusted identification information, where the plurality of trusted authorities collaborates with the identification management system to verify identity claims to create the verified identification information.

14. The system of claim 13 further comprising a communication network for coupling the identification management system to the trusted authority.

15. The system of claim 14 further comprising a service provider, coupled to the communications network, for sending identity claims for verification to the identification management system.

* * * * *